United States Patent [19]
Lobiondo

[11] Patent Number: 5,287,194
[45] Date of Patent: Feb. 15, 1994

[54] DISTRIBUTED PRINTING
[75] Inventor: Martin F. Lobiondo, Penfield, N.Y.
[73] Assignee: Xerox Corporation, Stamford, Conn.
[21] Appl. No.: 981,717
[22] Filed: Nov. 25, 1992
[51] Int. Cl.[5] .................. H04N 1/23; G03G 15/00
[52] U.S. Cl. .................. 358/296; 355/202; 395/114
[58] Field of Search .......... 355/200, 202, 204; 395/114; 358/296

[56] References Cited
U.S. PATENT DOCUMENTS

| | | | |
|---|---|---|---|
| 3,597,071 | 7/1971 | Jones | 355/202 |
| 4,476,486 | 10/1984 | Ayata et al. | 358/78 |
| 4,521,805 | 6/1985 | Ayata et al. | 358/75 |
| 4,527,885 | 7/1985 | Ayata et al. | 346/140 R |
| 4,587,532 | 5/1986 | Asano | 346/134 |
| 4,797,706 | 1/1989 | Sugishima et al. | 355/200 X |
| 4,839,829 | 6/1989 | Freedman | 395/155 |
| 4,947,345 | 8/1990 | Paradise et al. | 358/442 |
| 4,982,234 | 1/1991 | Filion et al. | 355/209 |
| 5,036,361 | 7/1991 | Filion et al. | 355/209 |
| 5,045,880 | 9/1991 | Evanitsky et al. | 355/200 |
| 5,053,970 | 10/1992 | Kurihara et al. | 364/468 |
| 5,111,391 | 5/1992 | Fields et al. | 364/401 |
| 5,123,089 | 6/1992 | Beilinski et al. | 395/200 |
| 5,128,860 | 7/1992 | Chapman | 364/401 |
| 5,128,878 | 7/1992 | Gore et al. | 395/162 |
| 5,130,806 | 7/1992 | Reed et al. | 358/296 |
| 5,179,637 | 1/1993 | Nardozzi | 395/114 |

OTHER PUBLICATIONS

Xerox Disclosure Journal, P. F. Morgan, vol. 16, No. 6, Nov./Dec. 1991, pp. 381-383, "Integration of Black Only and Color Printers".

Primary Examiner—Joan H. Pendegrass
Attorney, Agent, or Firm—Oliff & Berridge

[57] ABSTRACT

A printshop management scheduling routine and system which provide optimum scheduling of printer jobs on a network. The scheduling routine utilizes the total complex of printers available at local location and/or remote locations to allocate and complete printer jobs based on a plurality of criteria, including requested completion time for the project. If requested completion time does not allow printing of the print job by a sole printer, the print job is allocated to a plurality of available printers, each printing a portion of the complete print job.

6 Claims, 4 Drawing Sheets

DISTRIBUTED PRINTING

BACKGROUND OF THE INVENTION

1. Field of the Invention

The present invention relates to a printshop management scheduling routine which provides optimum scheduling of printer jobs on a network. The scheduling routine utilizes the total complex of printers available at local areas and/or remote locations to allocate and complete printer jobs based on a plurality of criteria.

2. Description of Related Art

U.S. Pat. No. 4,839,829 to Freedman discloses an automated printing control system for printing of a work. The system comprises a first terminal adapted for use by a requester to request work to be printed and to receive information concerning parameters for the printing of the work. A second terminal is adapted for use by a printing facility for receiving information concerning the printing of the work. A computer is in communication with the first and second terminals and interacts with both concerning pricing and administration. Parameters such as what type of work is to be printed, format, size, quantity, etc. are input through the first terminal. All of the parameters are used by the computer to develop cost information using pricing strategies based on available printing equipment or facilities. The requester then receives information regarding the pricing, timing, etc. and is given the opportunity to select a particular printing facility to complete the job. Once the facility is selected, the computer authorizes proceeding with printing of the job.

U.S. Pat. No. 5,128,878 to Gore discloses a remote plotting system in which a plot server computer is programmed to receive plot requests in a common spooling area sent from other workstations in a network, performing rasterization of data, and scheduling resulting plots to the first available plotter based on a round robin scheduling scheme.

U.S. Pat. Nos. 4,476,486, 4,521,805 and 4,527,885, all to Ayata et al., disclose an image recording system which utilizes a plurality of recording units within a recording apparatus. If more than one copy is requested, the copy job is divided among the available recording units to provide parallel printing. According to another aspect, each recording unit can be of a different type, i.e., a high speed black and white copier and a color copier.

U.S. Pat. No. 4,587,532 to Asano discloses a recording apparatus having a plurality of recording units. If more than one copy is requested, the copy job is divided among the available recording units to provide parallel printing.

U.S. Pat. No. 3,597,071 to Jones discloses a diverse input system for electrostatically reproducing and recording information.

Xerox Disclosure Journal, Vol. 16, No. 6, November 1991, Pgs. 381–383, discloses integration of a slower color printer with a higher speed black only printer to output collated job sets of black only copy sheets with color inserts at a rate at or near the full normal high speed copying rate of the high speed black only printer.

U.S. Pat. No. 5,123,089 to Beilinski et al. discloses an apparatus and protocol for a local area network. The network comprises a plurality of computers connected to a corresponding plurality of network controllers. In turn, each network controller is coupled to a corresponding I/O device such as a printer, plotter or modem.

U.S. Pat. No. 4,947,345 to Paradise et al. discloses a queue management system for a multi-function copier, printer and facsimile machine. Queue management between copying, printing and facsimile jobs is accomplished on a strict FIFO order or a modified FIFO order in which facsimile jobs are deferred.

U.S. Pat. No. 5,130,806 to Reed et al. discloses an electronic reprographic printing system that allows sending of messages with print jobs from remote user workstations to a central machine. The messages can be displayed on a User Interface.

OBJECTS AND SUMMARY OF THE INVENTION

It is an object of the present invention to provide a printshop scheduler routine which automatically schedules jobs at local or remote locations.

It is another object of the present invention to provide a printshop scheduler routine which can schedule and distribute a large job among a plurality of local and remote printers attached to a network.

It is another object of the present invention to provide a scheduling method which allows a user to enter all criteria relating to job requirements including completion time for the job, the scheduling method automatically scheduling the job to one or a plurality of printers based on availability and capability of the printers located on the network and the criteria associated with the print job.

It is another object of the present invention to provide a user at any local area within the network to control printing of a job at a plurality of user determined locations, the system providing communication with the user to confirm that each location can complete the desired job and the time at which the job will be completed.

The above and other objects are achieved by a printshop management scheduling routine and system which provide optimum scheduling of printer jobs on a network. The scheduling routine utilizes the total complex of printers available at local location and/or remote locations to allocate and complete printer jobs based on a plurality of criteria, including completion time for the project. The scheduler also determines or can have input the ultimate locations of the printing of the job.

According to a preferred embodiment, the scheduler allows a user to enter a plurality of criteria relating to job requirements including a required completion time for the job. The scheduler automatically optimally schedules the job to one or a plurality of printers based on availability and capability of the printers located on the network. If all printers are currently printing, but the time constraint is not pressing, the job can be scheduled to the next available printer on the network. If the network has available printers, but a single printer is incapable of completing the job by a required time, the scheduler can allocate portions of the job to a plurality of printers which can print the job in parallel to speed up the completion time to meet the requested time constraints. This may include allocating or dividing the job between a plurality of printers at locations remote from one another. The user is then informed where the job is being printed and when completion is expected.

These and other objects will become apparent from a reading of the following detailed description in connection with the drawings.

BRIEF DESCRIPTION OF THE DRAWINGS

The invention will be described in detail with reference to the following drawings wherein.

DETAILED DESCRIPTION OF PREFERRED EMBODIMENTS

Figure 1:
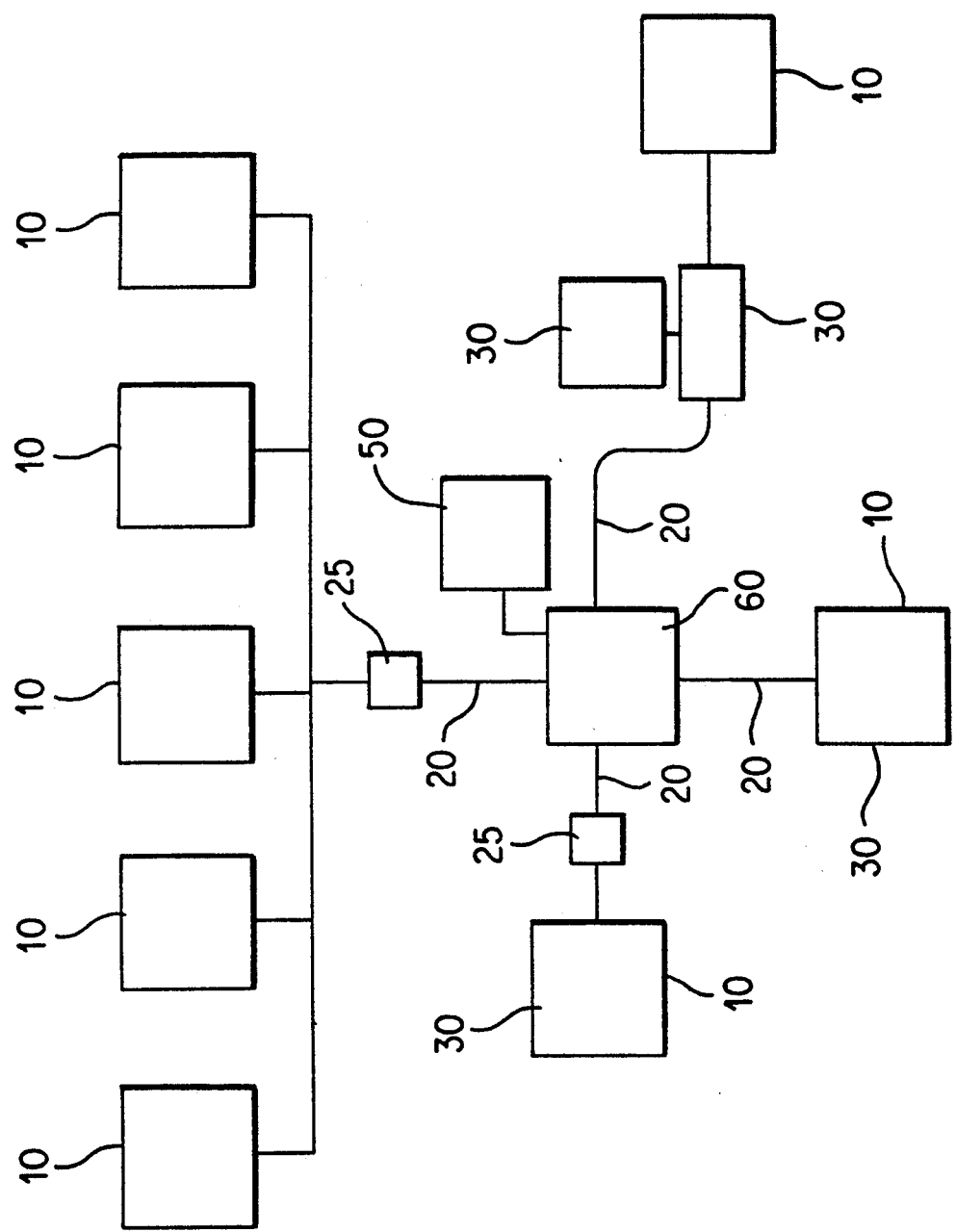
FIG. 1 shows a network according to the present invention.
Figure 2:
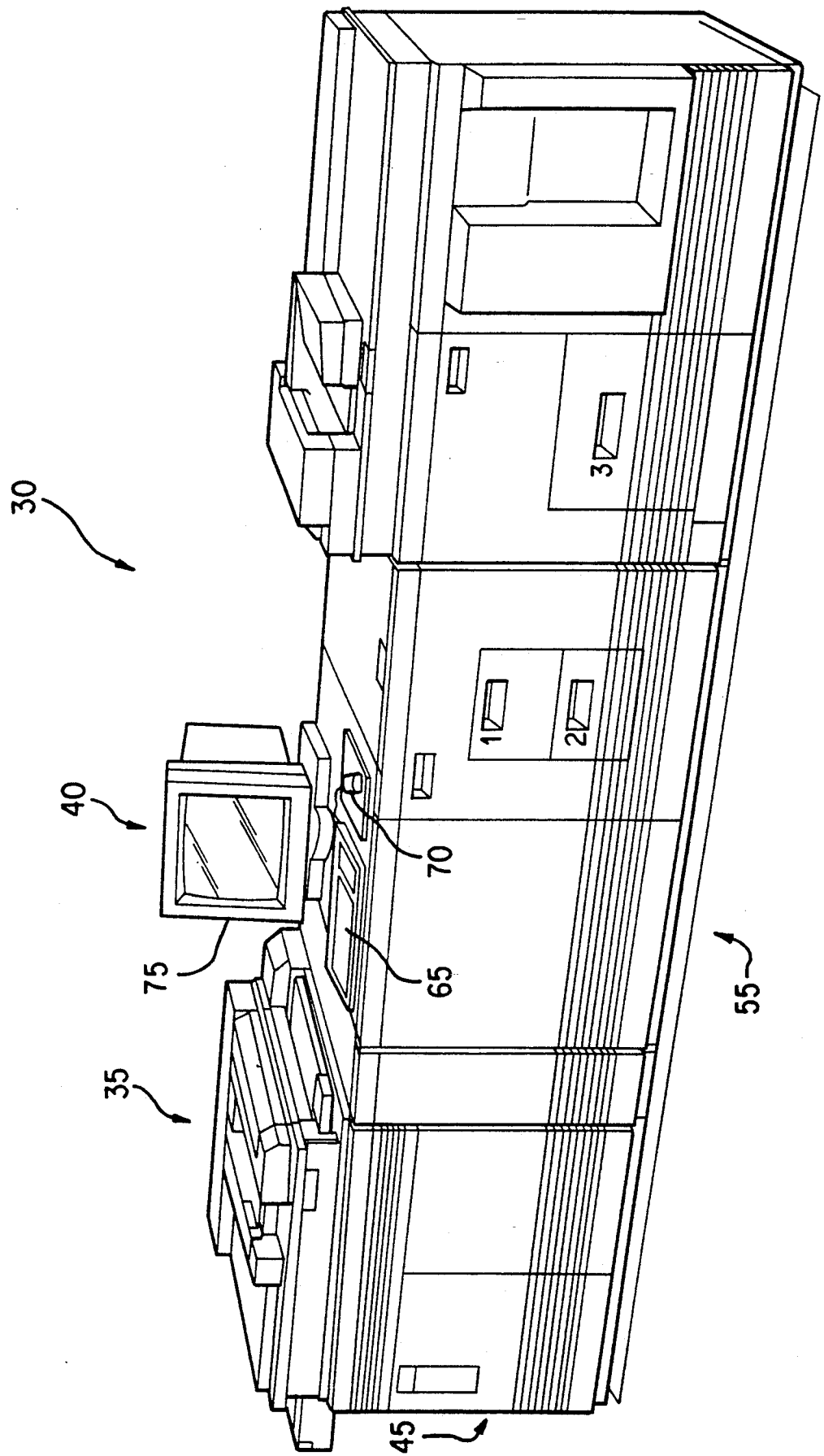
FIG. 2 shows an electronic reprographic machine which serves as one of a plurality of printers located on the network.

The present invention relates to a printshop scheduler routine which automatically schedules jobs at local or remote locations. As shown in FIG. 1, the scheduler routine can be used in conjunction with a network comprising a plurality of printers 10, such as the electronic reprographic machine shown in FIG. 2, which are interconnected through a communication link 20, such as, for example the Xerox Ethernet system. The network can be a LAN and may comprise one or more modems 25 which interconnect the printers 10 across communication channels of communication link 20, such as a telephone line. A plurality of workstations 30 are present at various locations within the network from which inputs for jobs to be printed can be entered. The workstations 30 can be a PC computer system, a dumb terminal, or an I/O device on one of the printers 10 such as the User Interface 40 shown in FIG. 2. Information relating to jobs to be printed can be input at the workstation 30 through appropriate input means, such as a keyboard or pull down menus on a touchscreen, into the network.

The information, which contains criteria for printing the job, can be sent to and temporarily stored in a buffer, RAM or other storage means located within a print server 60 or associated with the network and accessible by the print server 60. A printshop scheduler 50, which may be in hardware or software, is located within the network either at the print server 60 or at various local workstations 30 within the network for analyzing the information relating to the job, the print job data itself and known information about the current capabilities of all printing resources within the network and scheduling the printing of print jobs at one or more of the printers 10 to obtain an efficient use of all available resources.

According to an important aspect of the present invention, the entered information can include information relating to the time when the work is desired to be completed, as well as other criteria such as type of document, sizing criteria, formatting, margins, where copies are to be sent, etc. A user at one of the workstations 30 of the network enters a request to print a job, sends the print job data to a network print spooler 60, and enters all necessary criteria which is stored in an input data file in memory. Depending on the type of data to be printed, i.e., facsimile, E-mail transfer, copy, etc., the criteria that needs to be entered for each job can vary.

The scheduler 50 also is responsive to the capability and availability of each printer 10 on the network. A database can include one or more files having information relating to the print job and the resources on the network. The database can include a printer file which can be located in memory containing information relating to each printer, such as printer type, quality, speed, document size, capability, etc. This information is the basic information which does not usually change, but can be changed if the machine is upgraded or certain capabilities are permanently or temporarily unavailable. This information can be centrally stored or may be contained within each printer on the network. Additional files can be located in the database in memory which contain the current availability of all printers on the network (printer availability file) and a file which stores a map of all scheduled jobs and which printers are allocated for each job (schedule map file). Additional files containing various information can be employed.

The printshop scheduler 50 can schedule and distribute a large job, which may require the use of multiple printers 10 for a single job, among a plurality of local and remote printers 10 attached to the network. Standard processing and scheduling by humans cannot efficiently partition multiple jobs to take full advantage of the printer systems capacities. When multiple printers are present in the network, at one or more remote locations, it is extremely difficult for a human print manager to optimally schedule jobs. Although on a limited basis it may be possible, it is very time consuming and cannot provide real-time scheduling or even optimized scheduling when a large number of printers are to be managed.

After analysis of a new job, entered by a user located somewhere on the network, along with other jobs to be printed, the scheduler 50 can notify the user how the job was distributed or will be distributed, and when the job is to be completed.

For example, if a user requires 1000 sets of a document package by a certain time, the user would scan in the document or send the digital representation of the document into the network in a common printer spooling area. The inputting or programming of one or more jobs onto a printer or reproduction machine can be seen in U.S. Pat. Nos. 4,984,234 to Fillion et al. and 5,045,880 to Evanitsky, the disclosures of which are incorporated herein by reference. Additionally, the user would enter the time when completion of the job is required (and any other criteria associated with a print job) into memory within the print spooler 60. The scheduler 50 analyzes the printers 10 on the network and determines which printers 10 on the network are capable of producing the job, i.e., does the job require color reproduction, special paper, graphics, etc. Then, printers of the type capable of producing the job are checked for availability. If the time constraint on a particular job is short, the scheduler 50 checks for the fastest of these printers 10 to complete the job. If it is determined that a single printer 10 cannot complete the job by the required completion time, the scheduler 50 can allocate portions of the job among a plurality of available printers 10. The specific allocation can vary. For example, if available printers 10 have varying production speeds, the scheduler may allocate as much of the print job as possible to the fastest available printer 10, i.e., as much as that particular printer 10 can produce within the requested completion time. Any remaining portion of the print job can be allocated between one or more slower printers 10. Optionally, the print job may be allocated into equal portions among a plurality of available machines. Further, if a very urgent, important job is input into the system which has to be completed as soon as possible, irregardless of available printer resources, all available resources may be allocated to the job and any resources which become available during printing of the job may be assigned any portions of the job which have not yet been completed. This would fully utilize the total complex of available machines. Alternatively, it may be useful in the above instance to interrupt printing of any non-urgent job and commit all resources, or a certain number of resources, to the current urgent job. Preferably, the scheduler assigns complete sets of documents to multiple printers since collation of a set from partial sets at remote locations would be undesirable. The user is then informed where the job has been allocated and when completion is expected.

According to an alternative embodiment, the user is not required to enter time constrains as an input, but may have an automatically designated print location or a user selected print location. The scheduler 50 examines the print queue of the selected printer. If the queue is relatively empty, one or a few small jobs, the scheduler can allocate the job to the selected printer and inform the user of where the job was scheduled and when completion is expected. If a large number of jobs, or a large single job, are in the selected print queue, the scheduler 50 will prompt the user that the print queue is backed up and will have a completion time which is not in the near future. The user may then enter through the user interface a request to utilize a different printer, enter a required completion time and have the scheduler 50 allocate the job to one or more available printers, or choose the selected full print queue if printing is desired at the specific location selected and completion time is not important.

The scheduler 50 may provide printing at a certain predetermined location or specific printer 10 if so desired (or requested when entering criteria relating to a print job), or if unavailable, can select alternative printers 10 located near the predetermined location. If none are available, the scheduler 50 can select a remote location for printing. The scheduler 50 can allocate the job between a plurality of printers 10 at different remote locations. The present invention allows printshop managers to organize and optimize printing schedules fully utilizing all available printing capabilities.

Alternatively, it may be desirable for the user to send copies of a job to a plurality of remote locations. For instance, a user may desire a total of 500 copies of a document to be sent to several remote locations. The user can input the number of copies requested at each location and the time at which each location should complete the job. The scheduler 50 can determine availability of all remote locations and determine if the remote locations can complete the job by the desired completion time. If possible, the scheduler 50 allocates and prints the job at each location. If one or more locations are incapable of completion of the job, the scheduler 50 can inform the user of the problem and allow change in the time schedule or allow the user to select (or automatically select) alternative locations to print portions of the job which cannot be completed due to a lack of available resources or unable to complete by the requested completion time.

Figure 3:
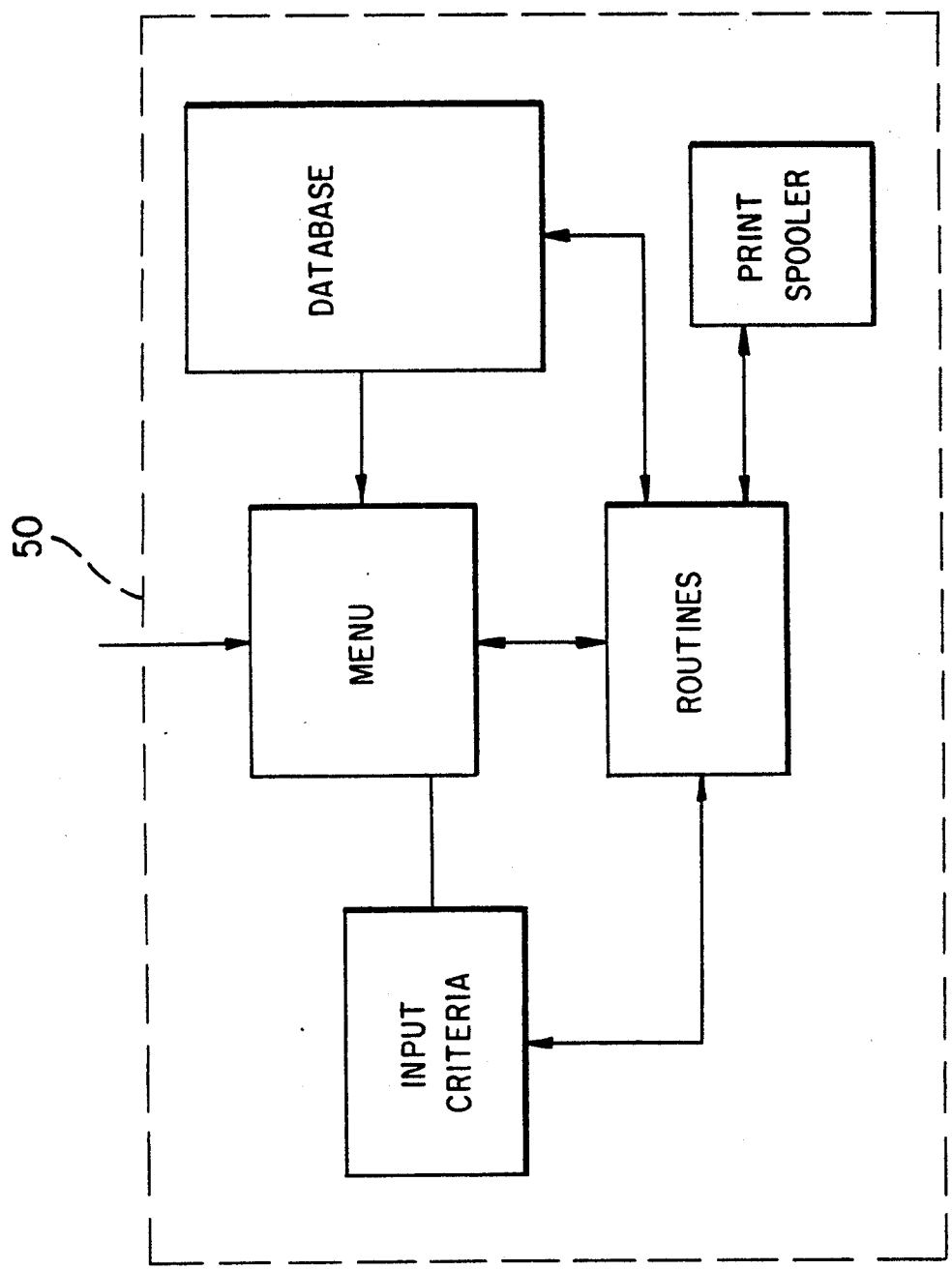
FIG. 3 shows a block diagram of a scheduler according to the present invention.

An example of a suitable printer for use with the present invention is a Xerox electronic reprographic printing system as shown in FIG. 3. An electronic reprographic machine which serves as one of the printers 10 and workstation 30 is shown having a User Interface 40. The reprographic machine 30 generally includes a scanner section 35, a controller section 45, and a printer section 55. The User Interface 40 includes a display 75 and input devices such as keyboard 65 and mouse 70 or a touchscreen. A detailed description of the machine can be found in U.S. Pat. No. 5,130,806, to Reed et al. assigned to the same assignee as the present invention, and incorporated herein by reference in its entirety.

Another feature of the present invention is provision of a user at any local area within the network to control printing of a job at a plurality of user determined locations, the system providing bidirectional communication with the user to confirm to the user that each location can complete the desired job, the time at which the job will be completed, or acknowledgement that the system cannot complete the job within the requested time constraint. The scheduler 50 in accordance with the present invention can establish communication between a user and the system to request entering of criteria. As shown in FIG. 3, the scheduler 50 can include menu-driven operation viewable though suitable display means such as display 60 on User Interface 40.

An example of this is as follows: Depending on the job type, certain criteria is requested including selection of media format, size, number of copies, completion time, etc. Once this information is entered, the print job data can be input into the system and sent to a common print spooler 60. Upon analysis of available printers and the entered criteria, the scheduler 50 schedules one or more printers 10 for printing of the job. Upon determination of a printing scheme, the scheduler 50 sends confirmation back to the user that the job is either being printed at one or more locations, will be printed at a determined location at a later time, or cannot meet the entered criteria and as such cannot print the job. The user may in the last case, be requested by the scheduler 50 to enter a later completion time, change any other criteria which can allow the job to be completed or to cancel the job. If the job can be printed at one or more non-selected locations, the user may allow printing at these locations such that the job can proceed to completion. Any job which has been scheduled will include feedback to the user which signifies that the job is in the system and will be completed by the required completion time or an estimated time. The scheduler 50 can predict when the print job will be completed and send this information to the user through the User Interface 40. This can be accomplished according to the disclosure of U.S. Pat. No. 5,036,361 to Fillion et al., incorporated herein by reference.

Figure 4:
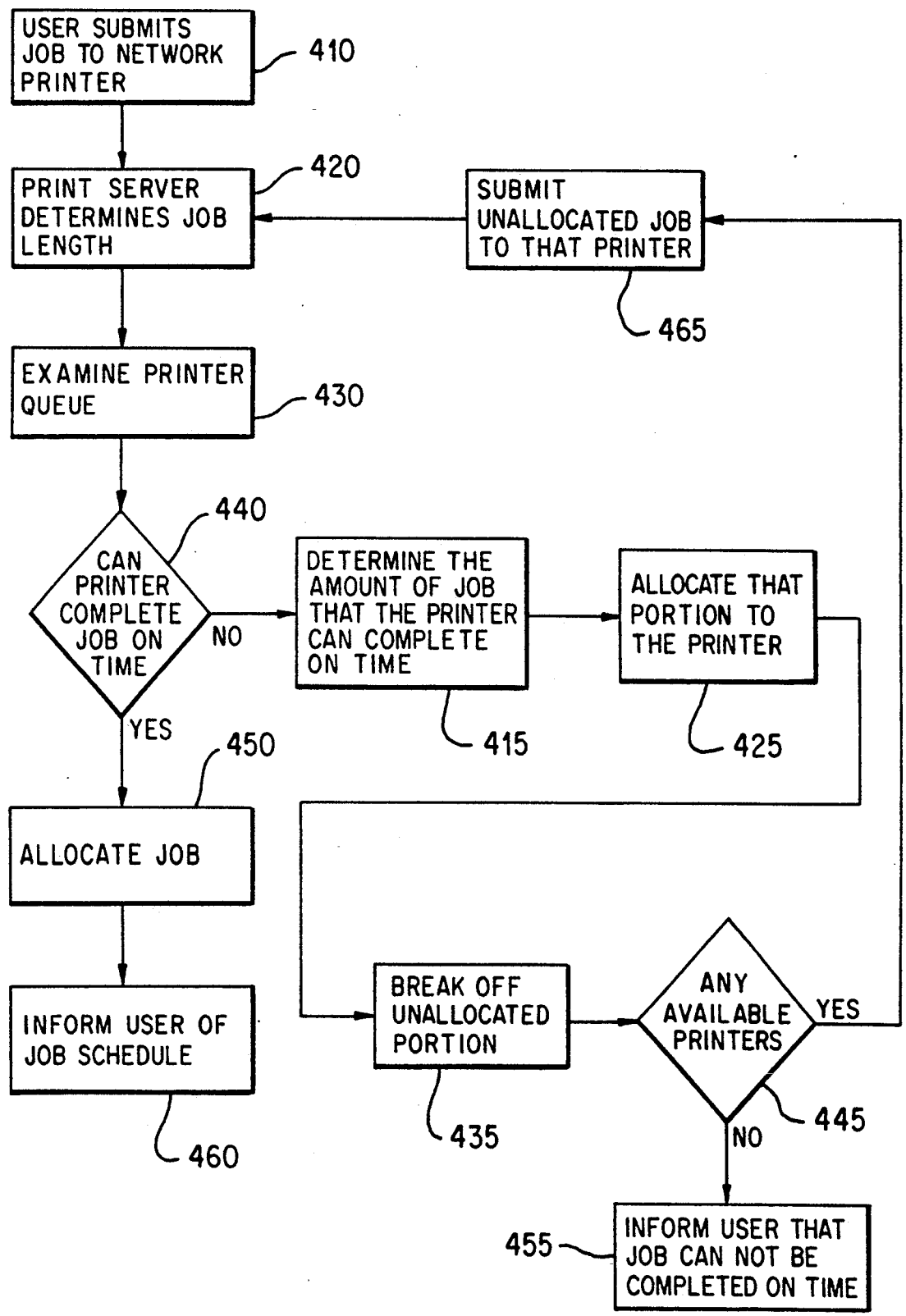
FIG. 4 is a flow chart of preferred scheduling steps.

An example of automatic print job distribution is shown in FIG. 4. A user inputs a job to a network printer (step 410). Print server 60 and scheduler 50 determine the job length (step 420) based on the number of copies, the particular machine, printing parameters such as simplex or duplex, etc. The scheduler 50 then examines the printer queue (step 430) and determines if the printer can complete the job by the required time (step 440). If the job can be completed on time the job is allocated to the printer (step 450). The user is then informed of the job schedule (step 460). If the printer cannot complete the job by the required time, the amount of the job that can be completed on time is determined (step 415). This preferably is done in complete sets so that partial sets are not split up among plural printers which could cause collation problems during assembly of the job. That portion of the job that can be completed by the printer is allocated (step 425). The unallocated portion of the job is then broken off from the allocated portion (step 435). The scheduler 50 then checks for any available printers (step 445). If no other printers are available, the scheduler 50 informs the user that the job cannot be completed on time (step 455). If another printer is available, it is selected and the unallocated portion is allocated to this available printer (step 465). The process then repeats by reverting to step 420, where the job length of the remaining job portion is determined.

The invention has been described with reference to the preferred embodiments thereof, which are illustrative and not limiting. Various changes may be made without departing from the spirit and scope of the invention as defined in the appended claims.

What is claimed is:

1. An automated scheduling method for a network having a plurality of printers located at various locations within said network, an input means, a scheduling means, and a communication link to connect said plurality of printers with each other and to said input means and said scheduling means, the network being capable of scheduling a complex of remote and local printers located on the network, the method comprising the steps of:

inputting from said input means a plurality of criteria relating to a print job requested by a user to said scheduling means, said criteria including at least the number of copies of said job requested, locations within said network where said job is to be printed, and a requested completion time for said job;

electronically analyzing said plurality of printers to determine availability of one or more of said plurality of said printers at each of said locations;

automatically electronically scheduling printing of said job at said locations;

electronically prompting said user if any of said locations cannot complete said job; and electronically prompting said user of an estimate of when completion of said print job can be expected.

2. The method of claim 1, wherein said criteria further includes entering the portion of said job to be allocated to each location.

3. The method of claim 1, wherein after said step of electronically prompting said user if any of said locations cannot complete said job, said scheduling means electronically prompts for input by the user selecting alternative locations for printing of said job.

4. The method of claim 1, wherein after said step of prompting said user if any of said locations cannot complete said job, said scheduling means prompts the user of automatically selected alternative locations for printing of said job.

5. An automated scheduling method for a network having a plurality of printers located at various locations within said network, an input means, a scheduling means, and a communication link to connect said plurality of printers with each other and to said input means and said scheduling means, the method comprising the steps of:

(a) submitting a job to a selected network printer;

(b) determining the length of said job;

(c) electronically examining the selected network printer print queue;

(d) electronically determining if the selected network printer can complete the job by a requested time;

(e) electronically allocating a portion of the job that can be completed by the requested time to the selected network printer for printing;

(f) electronically searching for other available printers;

(g) electronically allocating any unallocated portion of the job to an available printer; and (h) informing a user of the job schedule.

6. The method of claim 5, wherein step (g) is followed by determining the job length of the portion allocated to the available printer and determining if the available printer can complete the job portion by the required time.

* * * * *